United States Patent
Wang et al.

(10) Patent No.: US 11,161,753 B1
(45) Date of Patent: Nov. 2, 2021

(54) SOLAR-POWERED AUTONOMOUS ROBOTIC WATER SURFACE MAINTENANCE AND CLEANING SYSTEM

(71) Applicants: Lisa Rousha Wang, Belle Mead, NJ (US); Bingyan Steven Yu, Ningbo (CN); Hanou Wang, Baotou (CN); Lei Hei Dou, Victoria (CA); Baocheng Paul Duan, Beijing (CN); Yifei Jenny Jin, Beijing (CN); Jian Jim Wang, Belle Mead, NJ (US)

(72) Inventors: Lisa Rousha Wang, Belle Mead, NJ (US); Bingyan Steven Yu, Ningbo (CN); Hanou Wang, Baotou (CN); Lei Hei Dou, Victoria (CA); Baocheng Paul Duan, Beijing (CN); Yifei Jenny Jin, Beijing (CN); Jian Jim Wang, Belle Mead, NJ (US)

(73) Assignees: Lisa Rousha Wang, Belle Mead, NJ (US); Bingyan Steven Yu, Ningbo (CN); Hanou Wang, Baotou (CN); Lei Hei Dou, Victoria (CA); Beocheng Paul Duan, Beijing (CN); Yifei Jenny Jin, Beijing (CN); Jian Jim Wang, Belle Mead, NJ (US)

( * ) Notice: Subject to any disclaimer, the term of this patent is extended or adjusted under 35 U.S.C. 154(b) by 0 days.

(21) Appl. No.: 17/321,519

(22) Filed: May 17, 2021

(51) Int. Cl.
*C02F 1/00* (2006.01)
*C02F 103/00* (2006.01)

(52) U.S. Cl.
CPC .............. *C02F 1/008* (2013.01); *C02F 1/001* (2013.01); *C02F 2103/007* (2013.01); *C02F 2201/008* (2013.01); *C02F 2201/009* (2013.01)

(58) Field of Classification Search
None
See application file for complete search history.

(56) References Cited

U.S. PATENT DOCUMENTS

| 6,676,837 B2 | 1/2004 | Keeton |
| 7,481,159 B2 | 1/2009 | Poss et al. |

(Continued)

FOREIGN PATENT DOCUMENTS

| CN | 105329414 A | 2/2016 |
| WO | 2017118998 A1 | 7/2017 |

*Primary Examiner* — Richard C Gurtowski
(74) *Attorney, Agent, or Firm* — Treasure IP Group, LLC

(57) ABSTRACT

The present invention describes a water surface maintenance and cleaning system which comprises a home base station and a plurality of cleaning robot. The home station is either fixed on the water bank or floating on the water surface as an island. The home station serves as a charging station and trash collection station. The home base station is covered with solar PV panels and the PV panels convert the sunlight into electricity and then store the electricity into the batteries. The self-driving cleaning robot boat, which floats on water surface and drives around and sweeps the water surface. While sweeping across the water surface, the robot boat which is equipped with motor, rotors, pumps, nets, containers, etc. can intake water and filter out trashes and any other environmental unfriendly substances such as plastic bottles, cans, leaves, algae, plants, bio-films, and oil/grease.

8 Claims, 20 Drawing Sheets

(56) References Cited

U.S. PATENT DOCUMENTS

| | | | |
|---|---|---|---|
| 2011/0233149 A1* | 9/2011 | Hines | E02B 15/046 |
| | | | 210/776 |
| 2012/0152817 A1* | 6/2012 | Dague | E02B 15/105 |
| | | | 210/242.3 |
| 2014/0360859 A1 | 12/2014 | Faidi | |
| 2017/0022728 A1 | 1/2017 | Simik | |
| 2018/0163422 A1* | 6/2018 | Klebanov | C02F 1/001 |

* cited by examiner

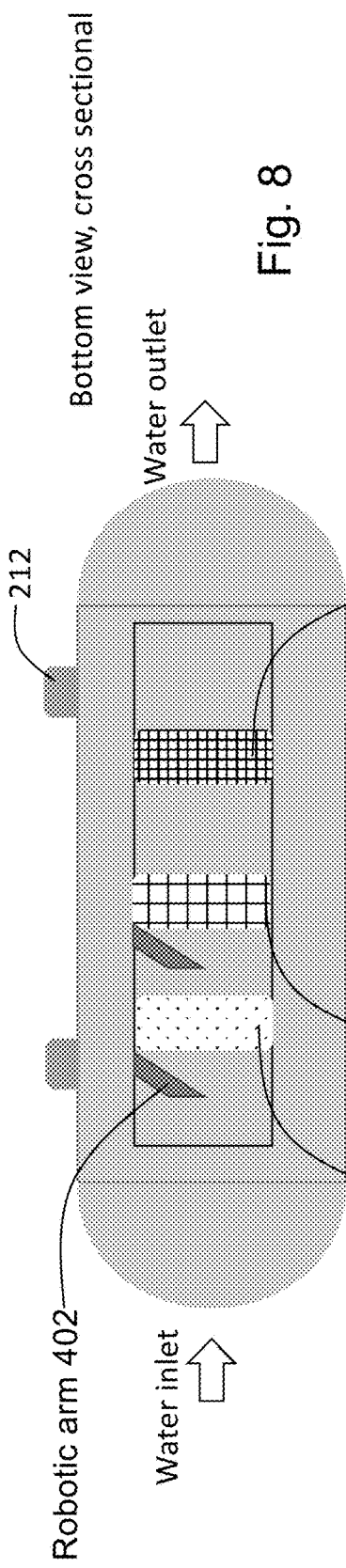
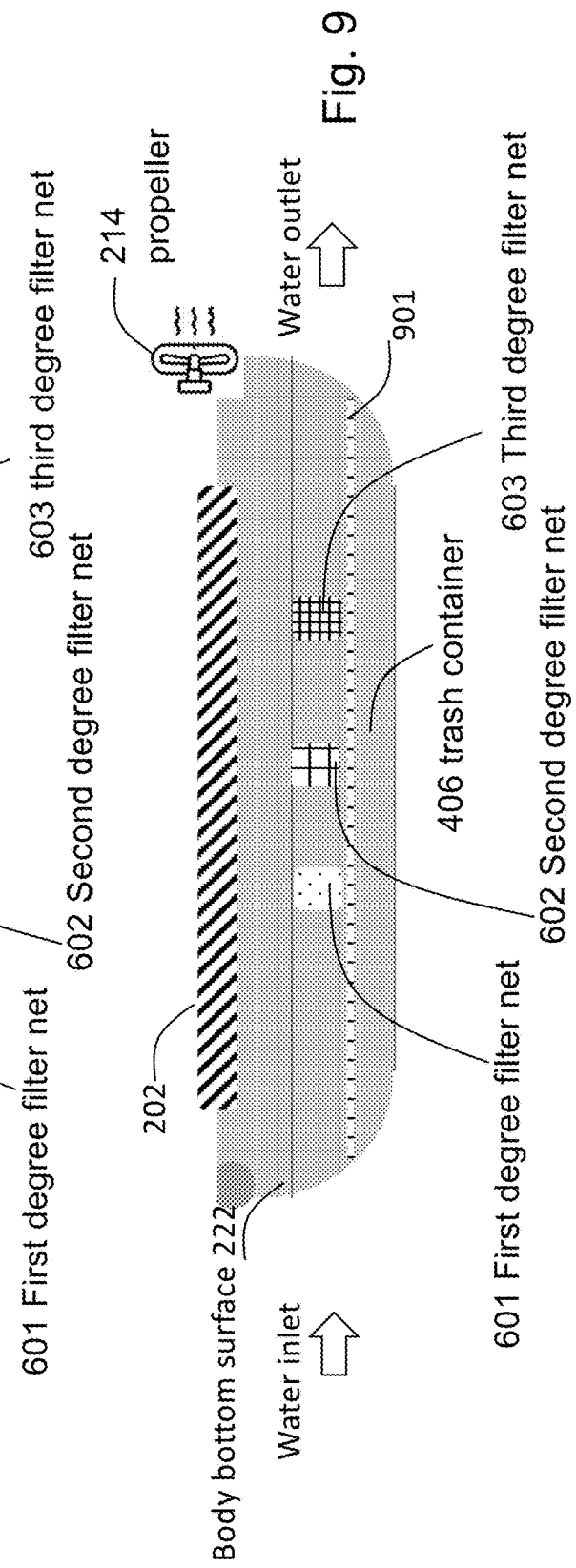

SOLAR-POWERED AUTONOMOUS ROBOTIC WATER SURFACE MAINTENANCE AND CLEANING SYSTEM

CROSS REFERENCE

None.

TECHNICAL FIELD

The present invention relates to a solar powered water surface maintenance and cleaning system, including a base and a plurality of cleaning robots. Especially the present invention relates to a solar powered cleaning robot and a method of using the same to clean a water surface.

BACKGROUND OF THE INVENTION

Clean water is vital to global health, communities, and economy. 70% of mother earth is covered with water. Worldwide, lake, river and ocean front accumulated many trashes which are even visible in satellite images. It is estimated that more than 8.3 billion tons of plastic waste enter the oceans each year, threatening global ocean health. Studies have found that even these plastics eventually degrade, it broke into small pieces particles which could accidentally eaten by fishes and other sea animals. In order to tackle this pressing matter, many scientist and engineers have tried to provide a solution from multiple directions. Some solutions are taking on an individual level while others are industrial sized approaches.

US 2014/0360859 describes and discloses a solar water purifier, including a solar panel, or direct heat from the sun, to boil, evaporate, and condense water to create a stream of purified water. In one embodiment, a boiling tank is mounted under and in direct thermal contact with a solar panel to absorb waste heat. In another embodiment, a transparent wall of the boiling tank is directly exposed to solar energy. Unpurified water enters the boiling tank from an inlet tank.

US 2017/0022728 teaches system and methods to support an autonomous pool skimming system, having a body with two or more hulls, and two or more paddlewheels may be coupled to the body, with an independent motor to drive each paddlewheel. The motors may be independently controllable to support steering. The pool skimming system may have one or more processing units, two or more distance sensors, one or more solar cells, and a power supply operable to power the processing units and the motors from energy supplied by the solar cells.

Additionally, solar power is energy from the sun that is converted to electrical energy. Solar energy is the cleanest and most abundant renewable energy source available, and the U.S. has some of the richest solar resources in the world. As well as a large amount of solar panels have been installed on residential homes, a significant amount commercial buildings and residential homes are not fit for rooftop installation for various reasons, including incorrect roof orientation, lack of usable roof area, shading issues, prohibitive, cost, architectural aesthetic considerations. To further increase the portion of renewable energy adoption, floating solar platforms on water has been disclosed. WO 2017/118998 teaches a floating solar platform includes a unified floating structure that is formed of a horizontal mesh of one or more horizontal support members connected to each other in a matrix pattern, and one or more vertical support members fixedly mounted on the horizontal mesh, a horizontal planar modular deck fixedly mounted on the unified floating structure, the horizontal planar modular deck being provided with at least one of: cables, inverters, microinverters, batteries, mechanical couplings, flat structural panels.

So far, many pioneers and campaigners, have realized the importance and urgency to clean up the waters. Some have called to clean up rivers before trashes enter the sea and have called to clean up oceans before more damages being done. However, given the humongous area that need to be cleaned, the amount of trash needs to be removed and the thoroughness it needs to be achieved, due to the lack of an effective way to clean up, little significant progress if not none has been made.

In view of the foregoing, there is a need for an automated, widely adopted method, to clean up water, ideally by using renewable energy such as solar power, to tackle water pollution. The automatic technology, not only eliminating manual labor, capable to cover large areas, work uninterrupted during the day and night to clean up rivers and oceans quickly without further waiting but also allow us to reach water surfaces far and near, easy and hard to reach.

SUMMARY OF THE INVENTION

The present invention discloses an autonomous robotic water surface maintenance and cleaning system for a target area and method of using the same. The autonomous robotic water surface maintenance and cleaning system comprises a plurality of water surface maintenance and cleaning robots, a base station, configured to provide power charge to the plurality of cleaning robots, and a self-driven path finder vehicle, configured to explore and inspect the target area.

It is one object of the present invention, to provide automatic robot that can clean the surface of the water to remove garbage as well as can to maintain through aeration as much as the target water area needs it. Said automatic robot can collect the different kinds of garbage and sort by size, which eliminate the need to sort garbage at the post-collection processing station.

It is another object of the present invention, to provide a pathfinder configured to investigate the water area to be cleaned beforehand so that the cleaning robot can clean and sweep the water surface in a more energy and time efficient manner.

It is still another object of the present invention, to provide a main station that can program and prepare the cleaning robots. The main station can also charge the robots through renewable energy. The main station can further gather and post process the garbage if needed. Additionally, the main stain may be provided with a floating fixture so it become an island station in the water.

It is yet another object of the present invention, to provide an operation protocol that the clean robots can intelligently clean the water surface and with optimized path.

According to a first aspect of the present invention, an autonomous robotic water surface maintenance and cleaning system for a target water area is described. The robotic water surface maintenance and cleaning system comprises a plurality of water surface maintenance and cleaning robots, a base station configured to provide renewable power to the plurality of water surface maintenance and cleaning robots, and a pathfinder configured to investigate the area to be cleaned and determining a target launch grid map, communicate to the base station.

In one embodiment, the plurality of water surface maintenance and cleaning robot, each is comprised of a robot body, configured to float on the water surface having a top surface and a bottom surface, including a head, tail, and elongated middle portion connecting to the head and tail; a propeller, receiving power from the rechargeable battery, driving the cleaning robot to its target location; a pedal, located at the tail of the robot body, configured to steer robot's orientation; a plurality of sensors, including a position sensor, configured to detecting the cleaning robot's position; a wave direction sensor, configured to detecting the flow direction of the water; a camera, placed at least on the head of the cleaning boat, capable of rotating 180 degrees, configured to take images of the water surface in a sweeping manner; a trash collecting assembly, removably attach to the bottom surface of the body, comprising at least one trash cleaning net, a robotic arm hingely attached to the bottom of the body configured to compress and push to the trash collected to a trash container underneath; and a control and communication unit, taking input from the sensors, and sending out operable instructions to the propeller, the pedal, the camera and sensors and the robotic arm of the trash collecting assembly.

In one variation, wherein the top surface of the cleaning robot is provided with a cavity, which is covered by a solar panel, connected to a rechargeable battery.

Said base station, disclosed herein, is equipped with a solar panel, converting solar power to charge rechargeable batteries; a plurality of charging adapters, configured to match and receive the charging adapters of the plurality of cleaning robots; a fixture, to support or anchor the solar panel; a trash processing unit, configured to receive the trash contained at the cleaning robot trash container for subsequent processing; and a central communication and control unit, configured to send and receive information from the cleaning robots.

In one variation, the base station is a fixed base station, placed outside of the target water surface to be cleaned. For example, the base station is installed on a river bank.

In another variation, the base station is a floated base station, placed inside of the target water surface to be cleaned. For example, the base station is installed in the target water part of the base station is floated above the water.

Said pathfinder, disclosed herein, is a self-driven path finder vehicle, capable of transporting on or above the target water surface, having a camera and at least one position sensor, configured to investigate the area to be cleaned and determining a target launch grid map, communicate said target grid map to the central communication and control unit of the base.

In one variation, the pathfinder is a drone.

In another variation, the pathfinder is a messenger robot, at least one position sensor, configured to detecting the cleaning robot's position and a wave direction sensor, configured to detecting the flow direction of the water.

According to a second aspect of the present invention, the invention features a method, a method to clean a target area of water surface, comprising providing a plurality of cleaning robots mapping out the target area water surface and determining an operational protocol including target launch grid position and target grid area for each cleaning robot; charging the cleaning robots at a first base station; sending instructions to each cleaning robot, including an intended cleaning protocol, and assigning target launch grid position and grid area for each cleaning robot; launching each cleaning robot to target grid position; removing garbage from the target grid area by each cleaning robot according to a collecting protocol; monitoring battery level and remaining garbage level according to a safety operation protocol; transferring trash collected to a second base station according to a disposal protocol; and returning trash collected to the second base station.

BRIEF DESCRIPTION OF THE DRAWINGS

The present invention will be more clearly understood from consideration of the description and drawings in which:

FIG. 8 is a bottom view of the embodiment of the exemplary clean robot in the absence of the solar panel so other structural components can be shown;

FIG. 9 is a side cross sectional view of the embodiment of the exemplary clean robot in the absence of the solar panel so other structural components can be shown;

References in the detailed description correspond to like references in the various drawings unless otherwise noted. Descriptive and directional terms used in the written description such as up, down, horizontal, vertical, upper, side, et cetera; refer to the drawings themselves as laid out on the paper and not to physical limitations of the invention unless specifically noted. The drawings are not to scale, and some features of embodiments shown and discussed are simplified or amplified for illustrating principles and features as well as advantages of the invention.

DESCRIPTION OF PREFERRED EMBODIMENTS

While the making and using of various exemplary embodiments of the invention are discussed herein, it should be appreciated that the apparatus and techniques for its use exemplify inventive concepts which can be embodied in a wide variety of specific contexts. It should be understood that the invention may be practiced in various applications and embodiments without altering the principles of the invention. For purposes of clarity, detailed descriptions of functions, components, and systems familiar to those skilled in the applicable arts are not included. In general, the invention provides apparatus, systems, and methods for moving and orienting remote objects. The invention is described in the context of representative example embodiments. Although variations and alternatives for the details of the embodiments are possible, each has one or more advantages over the prior art.

System

Cleaning Robot

In the scope of the present invention, cleaning robot is a surface maintenance and cleaning robot. For mere simply purposes, the description uses cleaning robot to refer. It can remove trash from a targeted water surface and transport to a target facility for post collection processing and storage. Trash, herein, means for any material not intended to be present or foreign to the native water in the target local water surface area, including both size medium too large ordinary garbage and size small particles. Trash includes plastic bottles, leaves, and cans; or algae, plants, bio-films, and oil/grease. The cleaning robot can also provide maintenance to the target water area, including killing bacteria and water aeration.

In some embodiment, the sizes of trashes are from sub-millimeter to a few meters. In another embodiments, the sizes of trashes are ranges from sub-millimeters to 20 center meters. The size herein is defined by the longest dimension of the trash.

FIGS. 2, 4-9 set forth detail illustration of one exemplary cleaning robot according to the aspects of the present invention.

Figure 2:
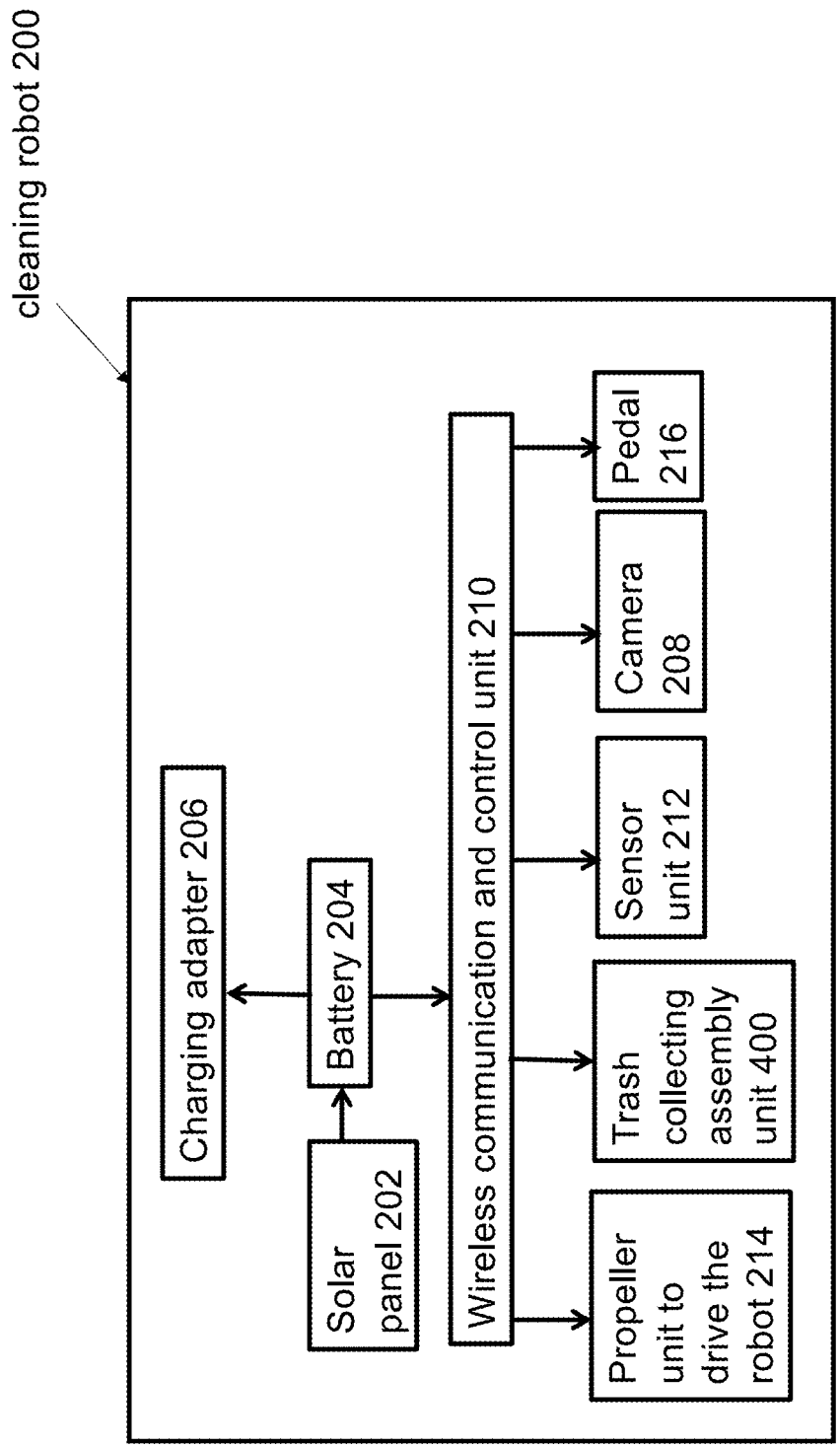
FIG. 2 is a schematic illustration of a cleaning robot and the power and instruction flow among the respective components.
Figure 3:
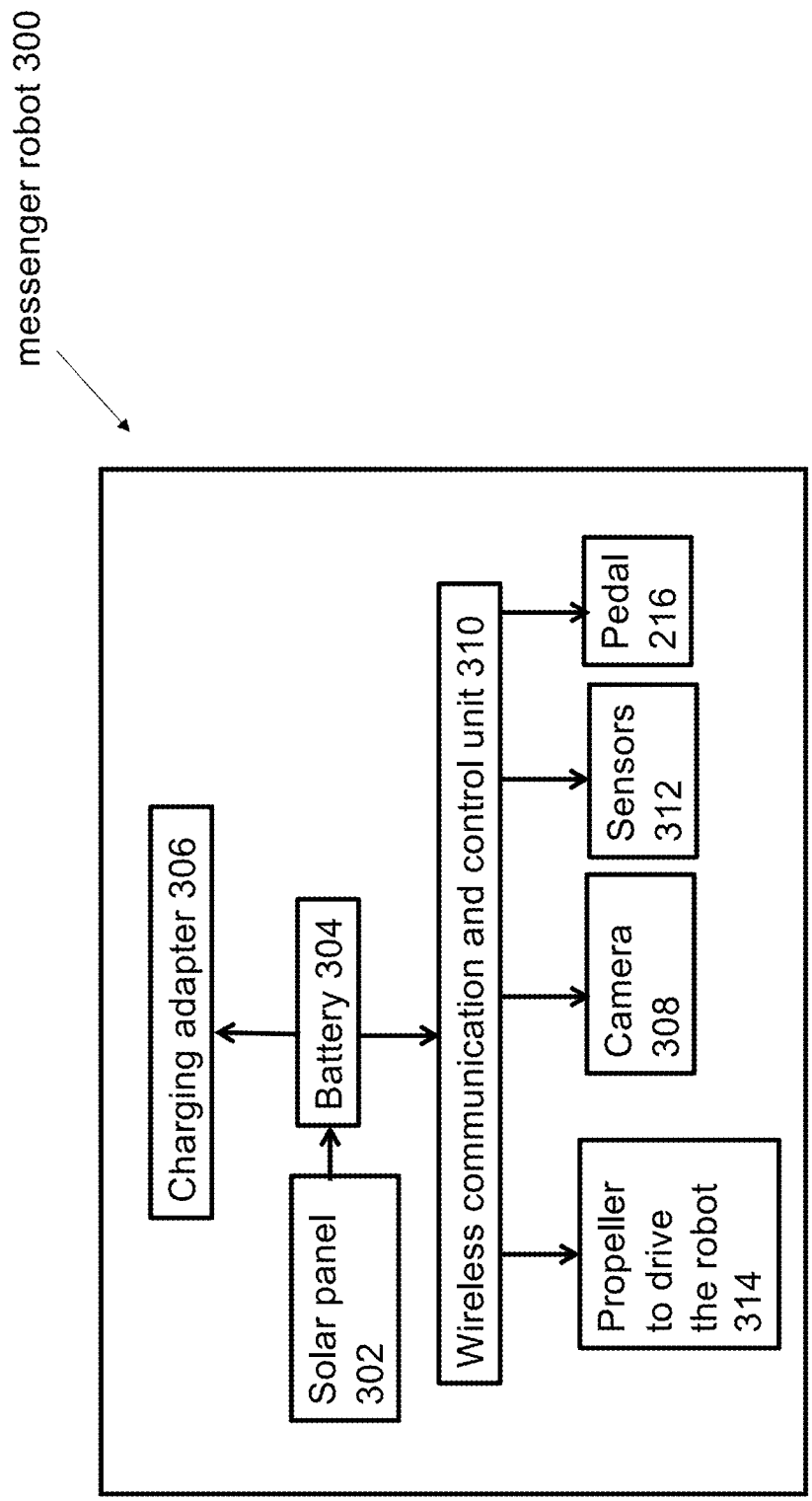
FIG. 3 is a schematic illustration of a messenger robot and the power and instruction flow among the respective components.

Referring to FIG. 2, cleaning robot 200 comprises an essential wireless communication and control unit 210, which receives information from central communication and control unit 110 from the home base 100, and send operable instructions to a propeller unit 214, a trash collecting assembly unit 400, a sensor unit 212, a camera 208 and a pedal 216. Additionally, battery unit 204 is connected to and controlled by the wireless communication and control unit 210, to turn on or turn off the power to the propeller unit 214, a trash collecting assembly unit 400, a sensor unit 212, a camera 208 and a pedal 216. Furthermore, a charging adapter 206 is provided so that the battery unit can be charged at the home station 100 through battery unit 104 of the home station, which ultimately collect renewable energy through solar panel 102, to maximize benefit from the renewable energy.

Optionally or preferably, each cleaning robot 200 is removably attached with a solar panel 202, which collects solar energy and charge the rechargeable battery when the cleaning robot is at the working period and or standby period.

Figure 6:
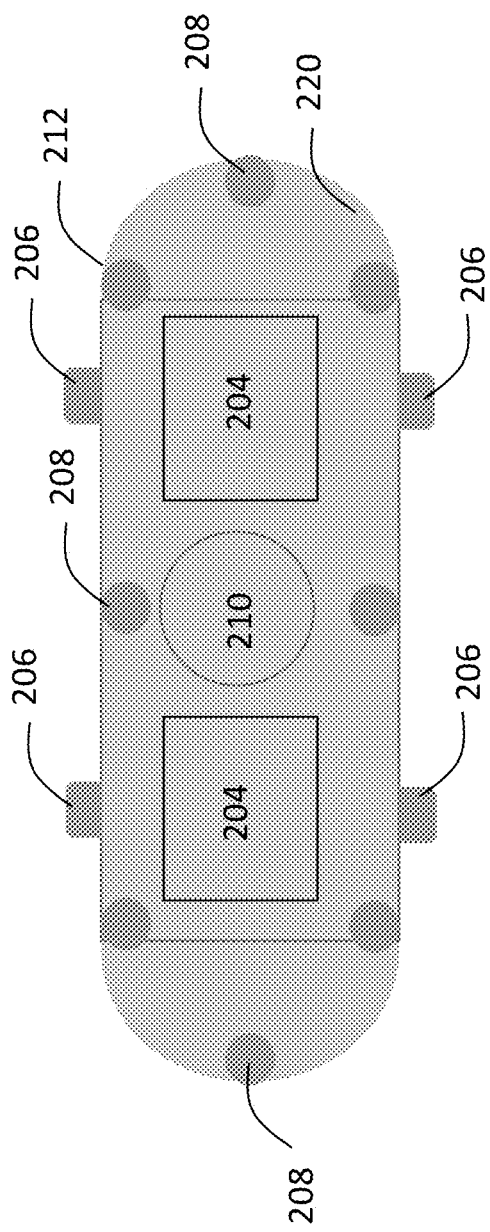
FIG. 6 is a top view of an embodiment of an exemplary clean robot in the absence of the solar panel so other structural components can be shown.

FIG. 6 is a top view of an embodiment of an exemplary clean robot, in the absence of the solar panel. The cleaning robot comprises a robot body. Said robot body is configured to float on a water surface. The robot body has a top surface and a bottom surface, including a head, tail, and elongated middle portion connecting to the head and tail.

Battery unit 204 is a weight element of the cleaning robot. In one example, as shown, the communication and control unit 210 is placed on or near the weight center of the cleaning robot. Two battery units 204 are placed symmetrically on both sides of the communication and control unit 210. Cameras 208 are provided at least on the head of the cleaning robot body. The floatable body of cleaning robot are furnished with one or more battery adapters 206 on the periphery.

A plurality of sensors 208 are further installed along the elongated middle portion of the body of the cleaning robot. The sensors include are not limited to a position sensor, a wave direction sensor, and radar sensor. Said position sensor is configured to identify the cleaning robot's position. The position sensor, in one embodiment, is a GPS sensor. It detects the current position of the cleaning robot and send the GPS location information back to the communication and control unit 210.

Said wave direction sensor, is configured to detecting the flow direction of the water. In one embodiment, the wave direction sensor is an acceleration sensor, which can detect the movement of the surround water and send information to the communication and control unit 210.

Said radar sensor is configured to detect a distance between the cleaning robot and an obstacle. The radar can sense the surrounding distance at a few centimeters to a few meters according to a predetermined time protocol. In one example, radar starts to sense an approaching neighboring clean robot starting at 10 meters away. In one example, radar starts to sense an approaching neighboring clean robot starting at 50 meters away.

Said camera, placed at least on the head of the cleaning boat, capable of rotating 180 degrees, configured to take images of the water surface. In one example, the camera images the water surface in a sweeping manner. In another example, the camera takes selected nap shots at different time intervals. Said camera can send images to the wireless communication and control unit 210.

Figure 7:
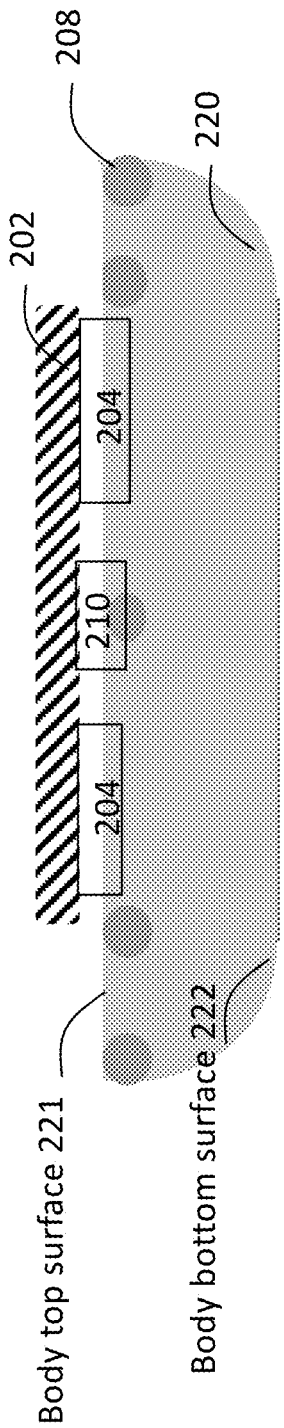
FIG. 7 is a left side view of the embodiment of the exemplary clean robot in the absence of water filtration pathway and garbage collecting and storage are omitted for clarify purpose.
Figure 10:
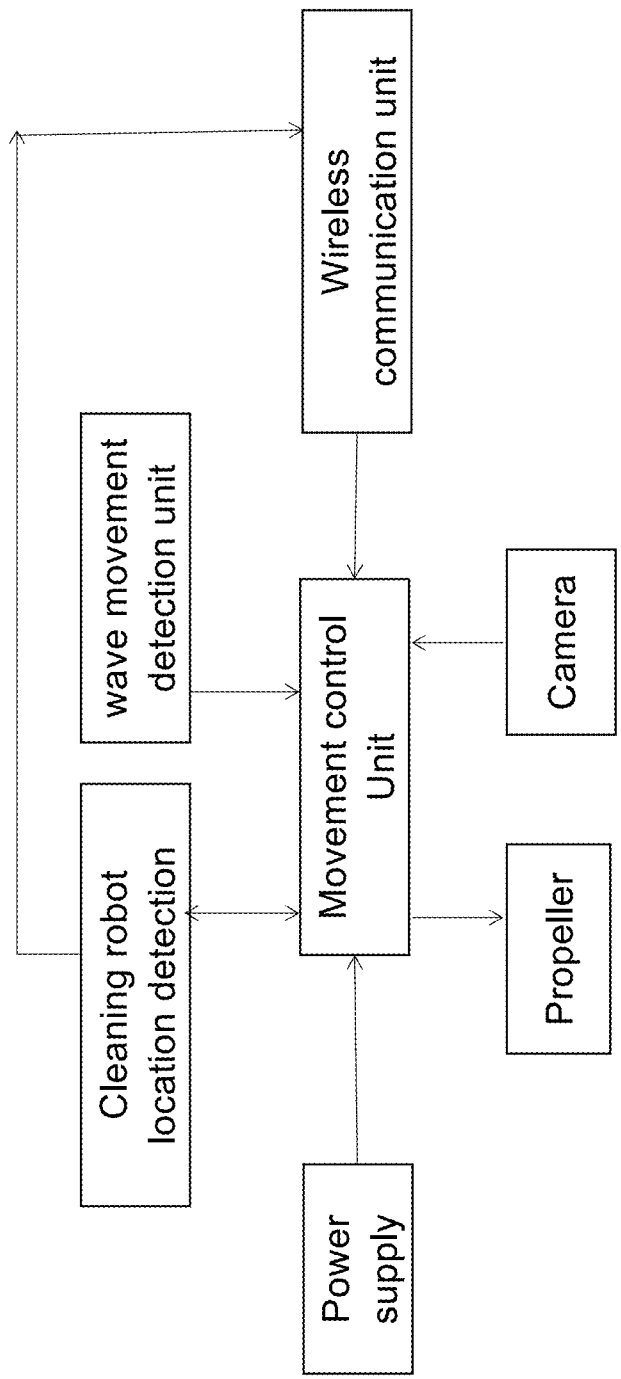
FIG. 10 is a schematic exemplary illustration of clean robot's control unit and its information flow with other components.
Figure 11:
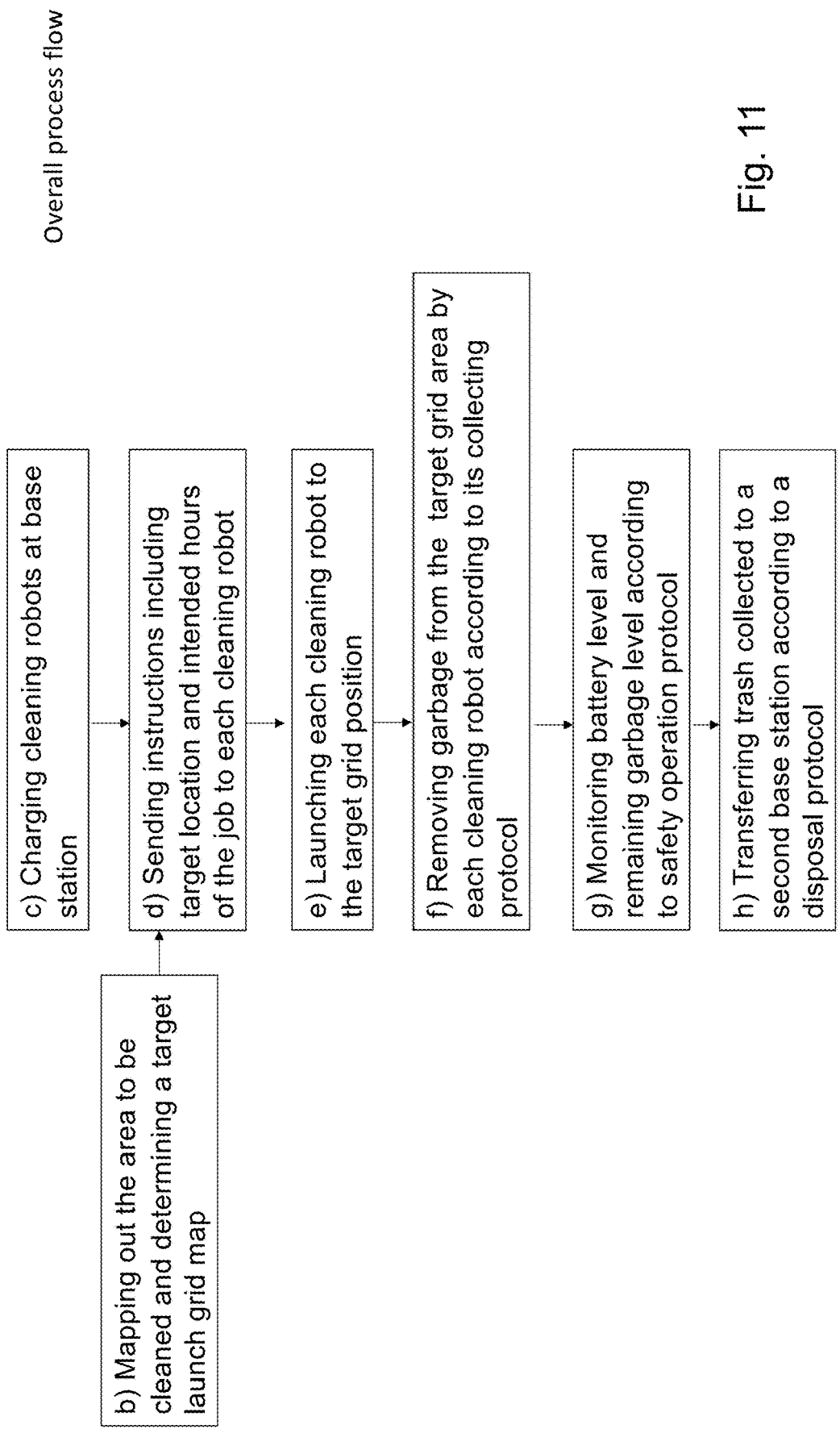
FIG. 11 is an exemplar process flow diagram of the present invention.
Figure 12:
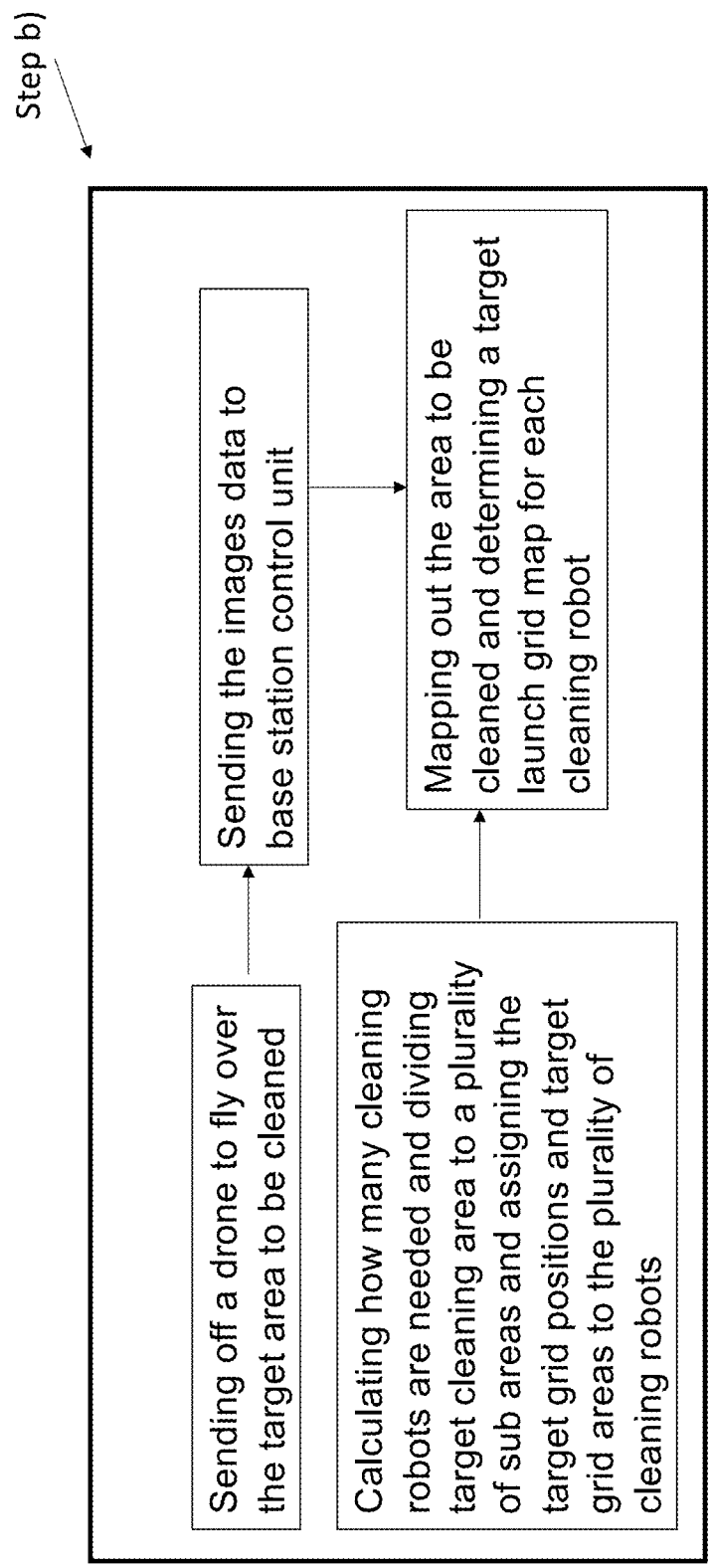
FIG. 12 is an embodiment of the step a) in the process step of FIG. 11.
Figure 13:
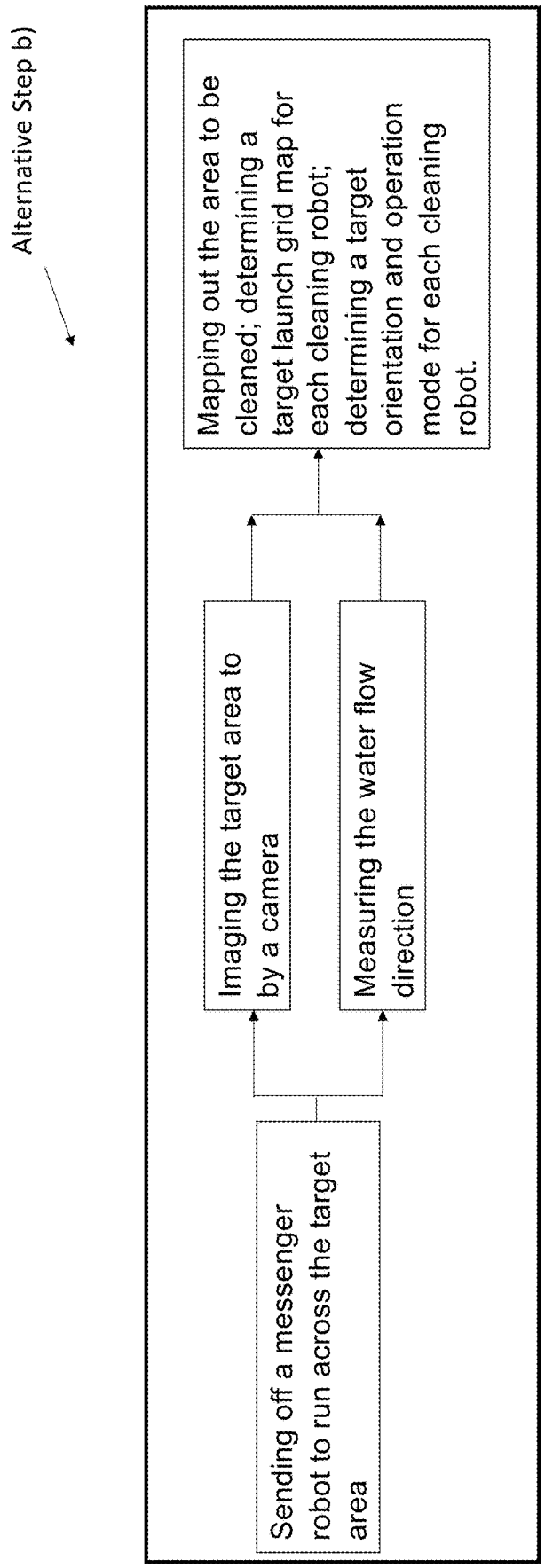
FIG. 13 is an alternative embodiment of the step a) in the process step of FIG. 11.
Figure 14:
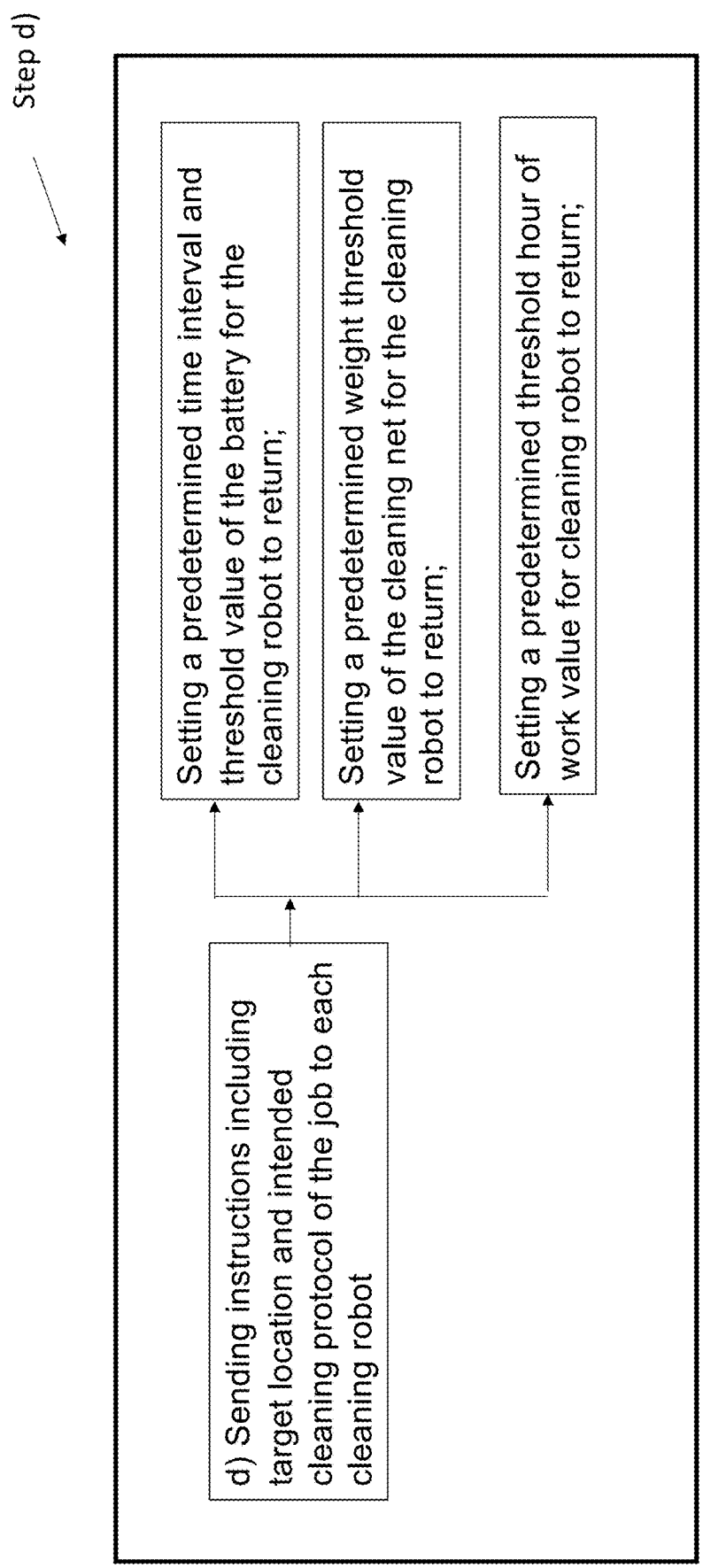
FIG. 14 is an embodiment of the step c) in the process step of FIG. 11.
Figure 15:
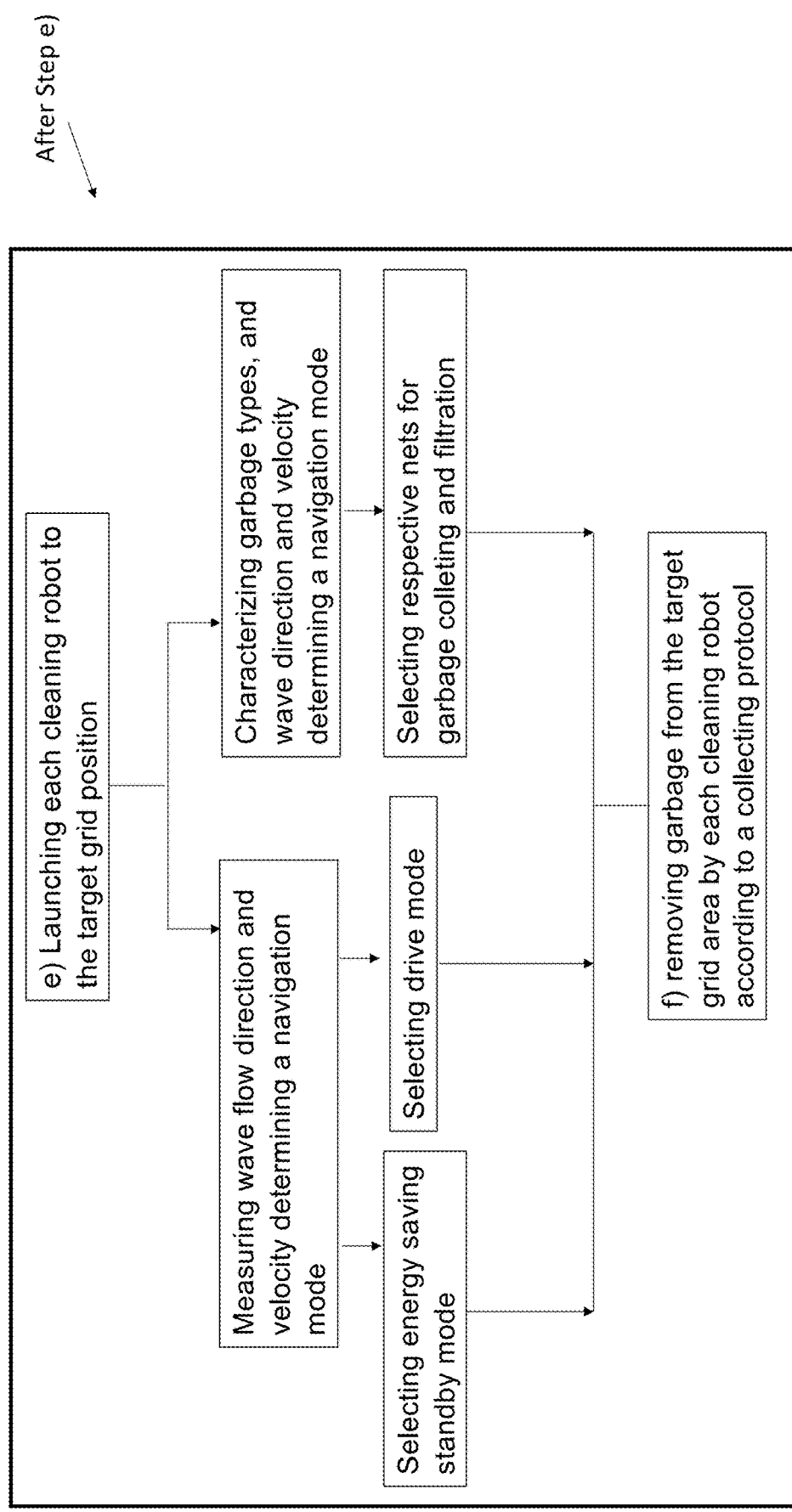
FIG. 15 is an embodiment of the step d) in the process step of FIG. 11.
Figure 16:
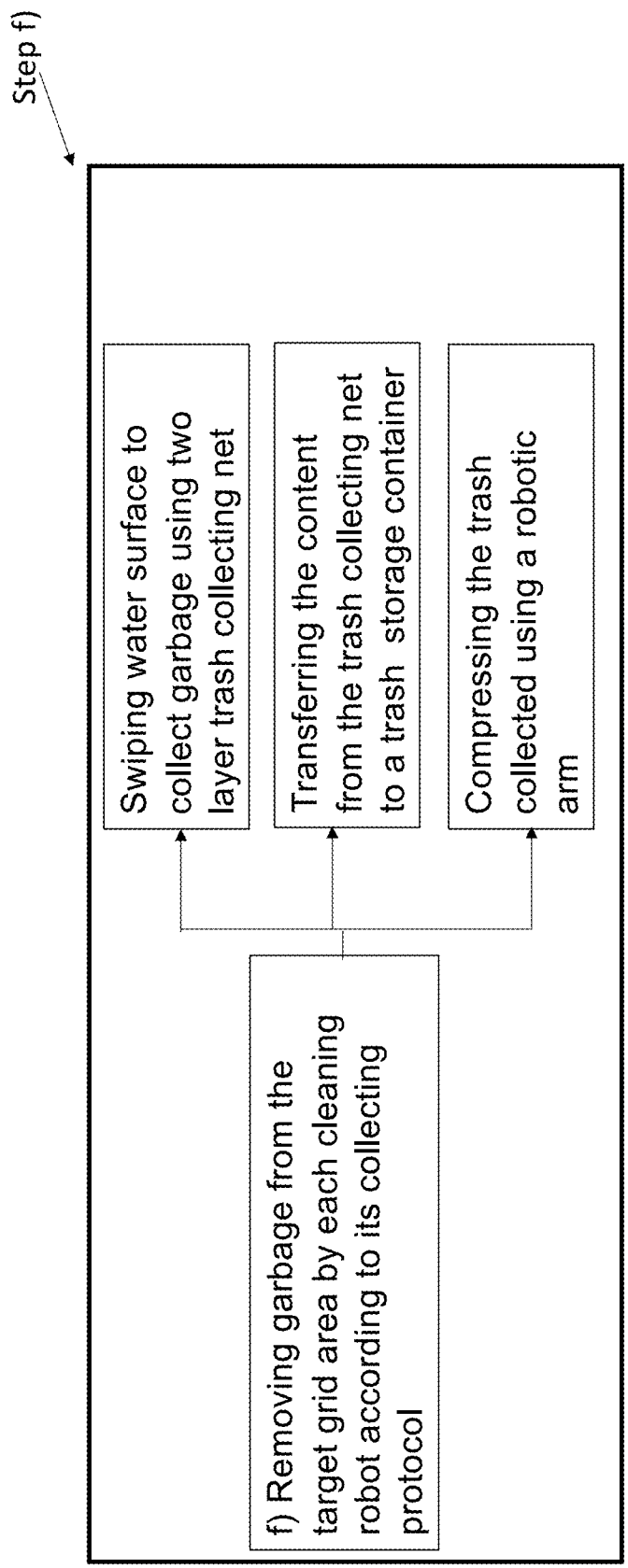
FIG. 16 is an embodiment of the step e) in the process step of FIG. 11.
Figure 17:
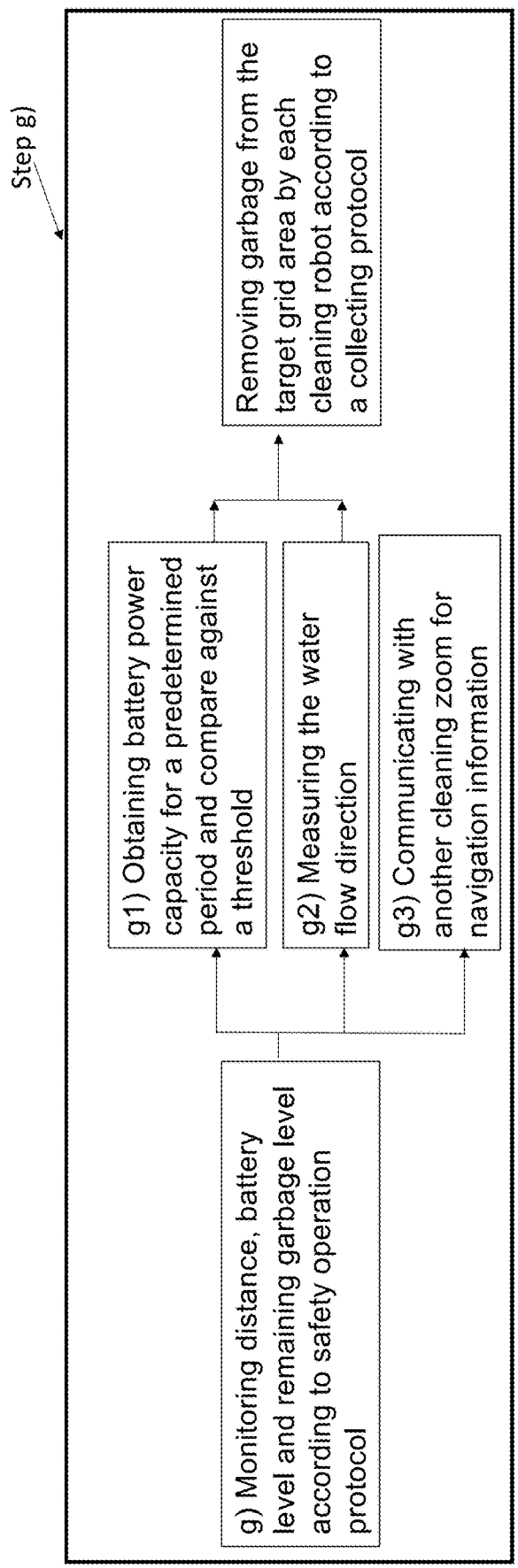
FIG. 17 is an embodiment of the step f) in the process step of FIG. 11.
Figure 18:
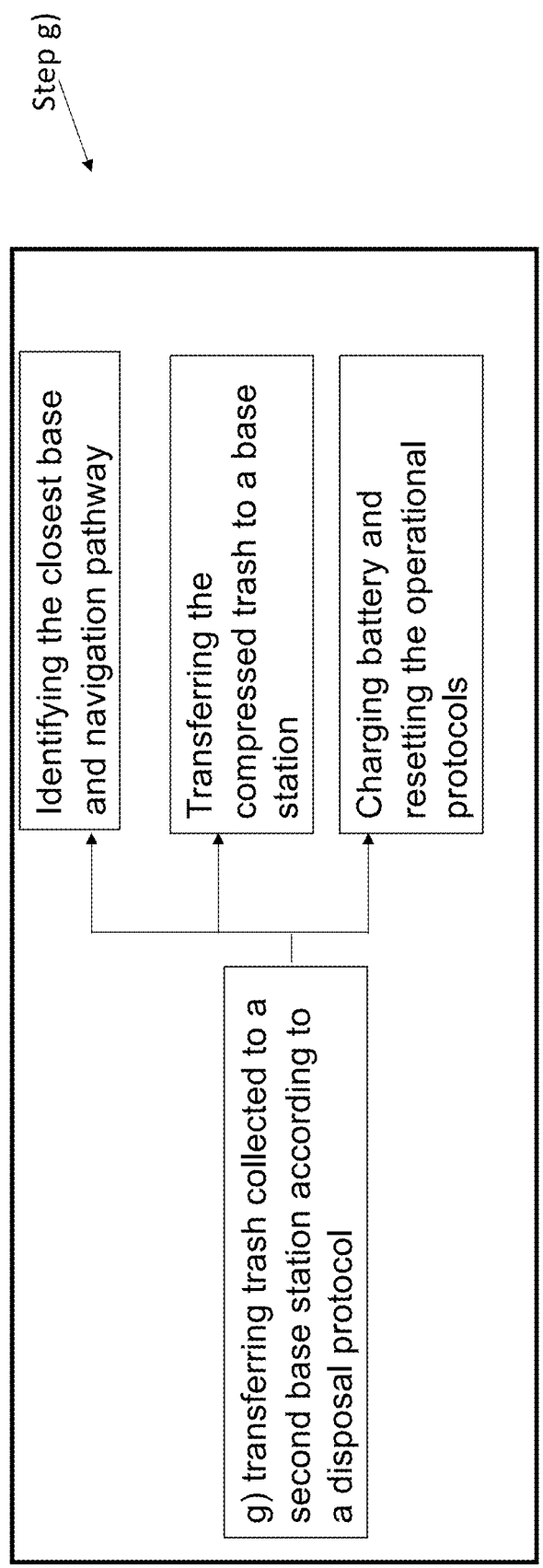
FIG. 18 is an embodiment of the step g) in the process step of FIG. 11.
Figure 19:
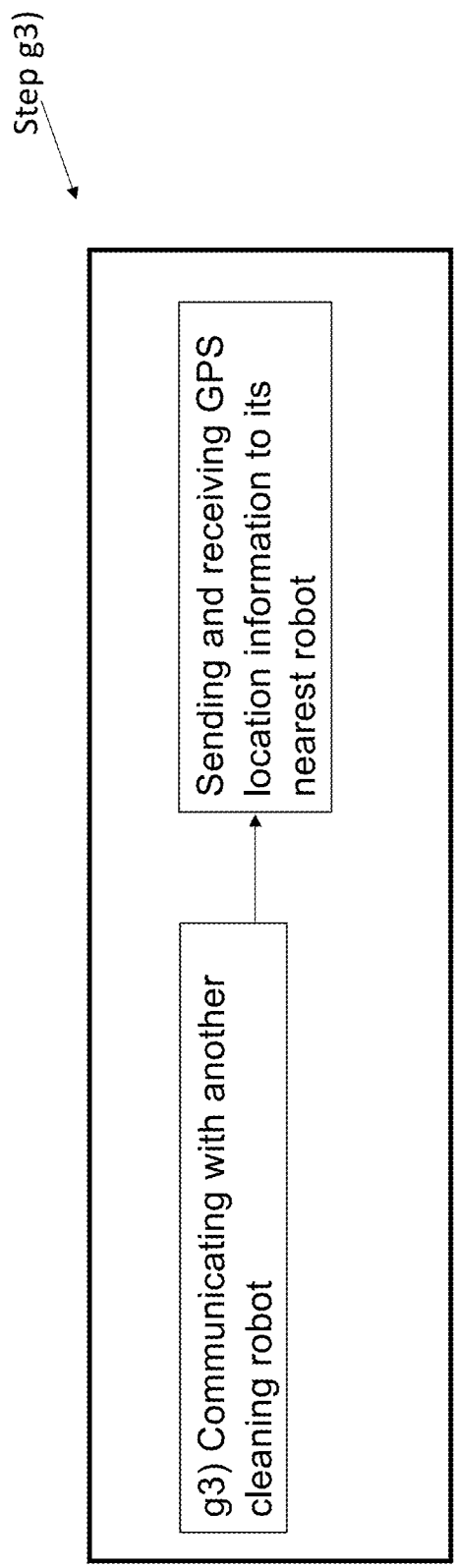
FIG. 19 is an embodiment of the step f3) in the process step of FIG. 17.

FIG. 7 depicts a side view of the body of the cleaning robot. Preferably, the top surface of the body 221 is formed with a concave cavity, and solar panel 202 is supported above the top surface 221 and connected to the pair of the rechargeable battery units 204.

The cleaning robot further comprises a trash collecting assembly, removably attach to the bottom surface of the body. Referring to FIG. 9, the trash assembly comprises at least one trash cleaning net, a robotic arm hingely attached to the bottom of the body configured to compress and push the trash collected to a trash container underneath.

The cleaning robot further comprises a control and communication unit, taking input from the sensors, and sending out operable instructions to the propeller, the pedal, the camera and sensors and the robotic arm of the trash collecting assembly.

Figure 5:
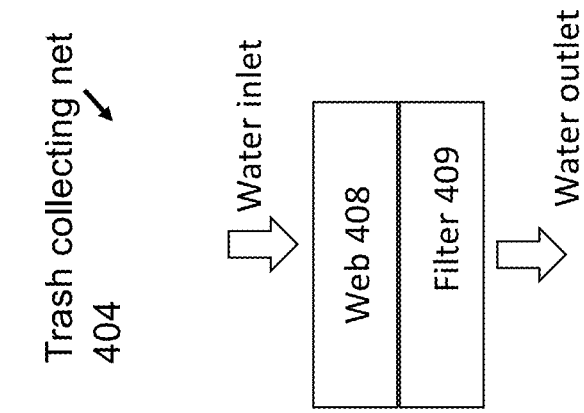
FIG. 5 is a schematic illustration of a trash collecting net and its operational protocol.
Figure 4:
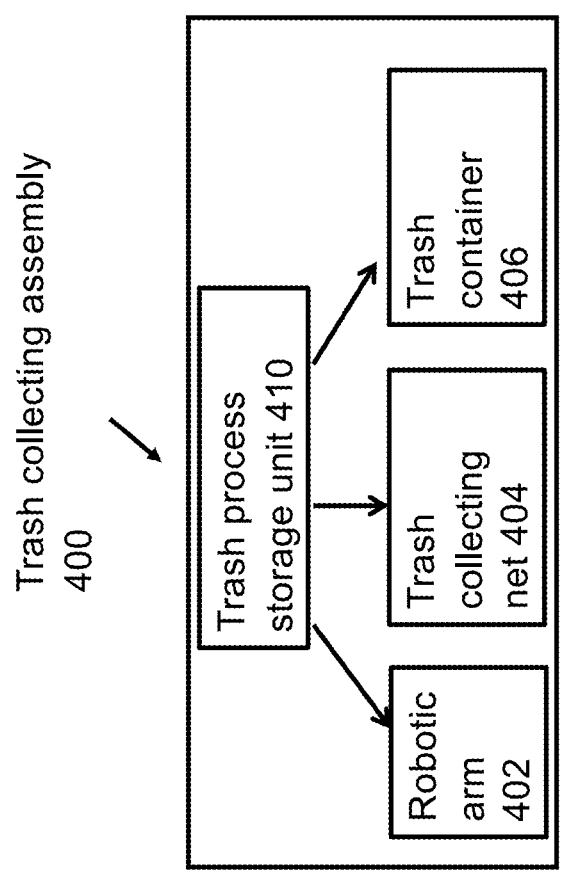
FIG. 4 is a schematic illustration of a trash process storage assembly and instruction flow among the respective components.

FIGS. 4 and 5 illustrate further details of trash assembly. Said trash assembly comprises a robotic arm 402, trash collecting net 404 and trash container 406. In one embodiment, the operation of the robotic arm is controlled by the trash process storage unit 410. In an alternative embodiment, the operation of the robot arm is controlled by the wireless communication and control unit 210.

Trash collection net in the present invention, includes all possible filtration nets. The filtration net can be made of metal wire or plastic strands, which stops particles that are too large from passing through openings in the mesh. Further in one example, the filtration net can be easily cleaned using backwash.

Referring to FIGS. 8 and 9, one or more cleaning net can be sandwiched between the bottom surface of the body and trash container. The cleaning nets have increasing mesh in the water flow direction, which designed to remove trashes with decreasing dimensions. The larger the mesh numbers, the greater the number of openings per inch and the smaller the openings in the mesh. In one example, as show in FIG. 5, the trash collecting net is a two-layer structure, in the water flow direction, from water inlet to water outlet, a web 408 with coarse mesh is first provided and then a filter with finer mesh installed. In another example, referring to FIGS. 8 and 9, the trash collecting net is a three-layer structure, in the water passage, the cleaning robot is fitted with a first-degree filter net, second degree filter net, and third-degree filter net.

When the trash enters into the water passage, a space between the bottom surface of the clean robot body and trash container, after being separated from water, it was first stopped and temporarily stored near the filter net. As the amount of the trash or the weight of the trash accumulates, they are ready to be pressed and transferred to trash container. In one example, the water passage will emerge above the water so that when the trash accumulated are transferred into the trash container, water will not flood in. In another example, the trash accumulated will be lifted above the surface by a robotic arm and then transferred into the trash container. In one example, an additional net is placed in between cleaning net and trash container.

The trash transferred into the trash container through the removable divider under the water passage, which is designed to swing open and close.

On a roof of water passage, one or more robot arms are provided to facilitate the transfer or compression of the trash accumulated.

Propeller 214 is positioned at the tail of the body of the cleaning robot, either positioned above the water surface or positioned under the water surface. In some embodiments, more than one propeller is added above the water surface.

Home Base

Figure 1:
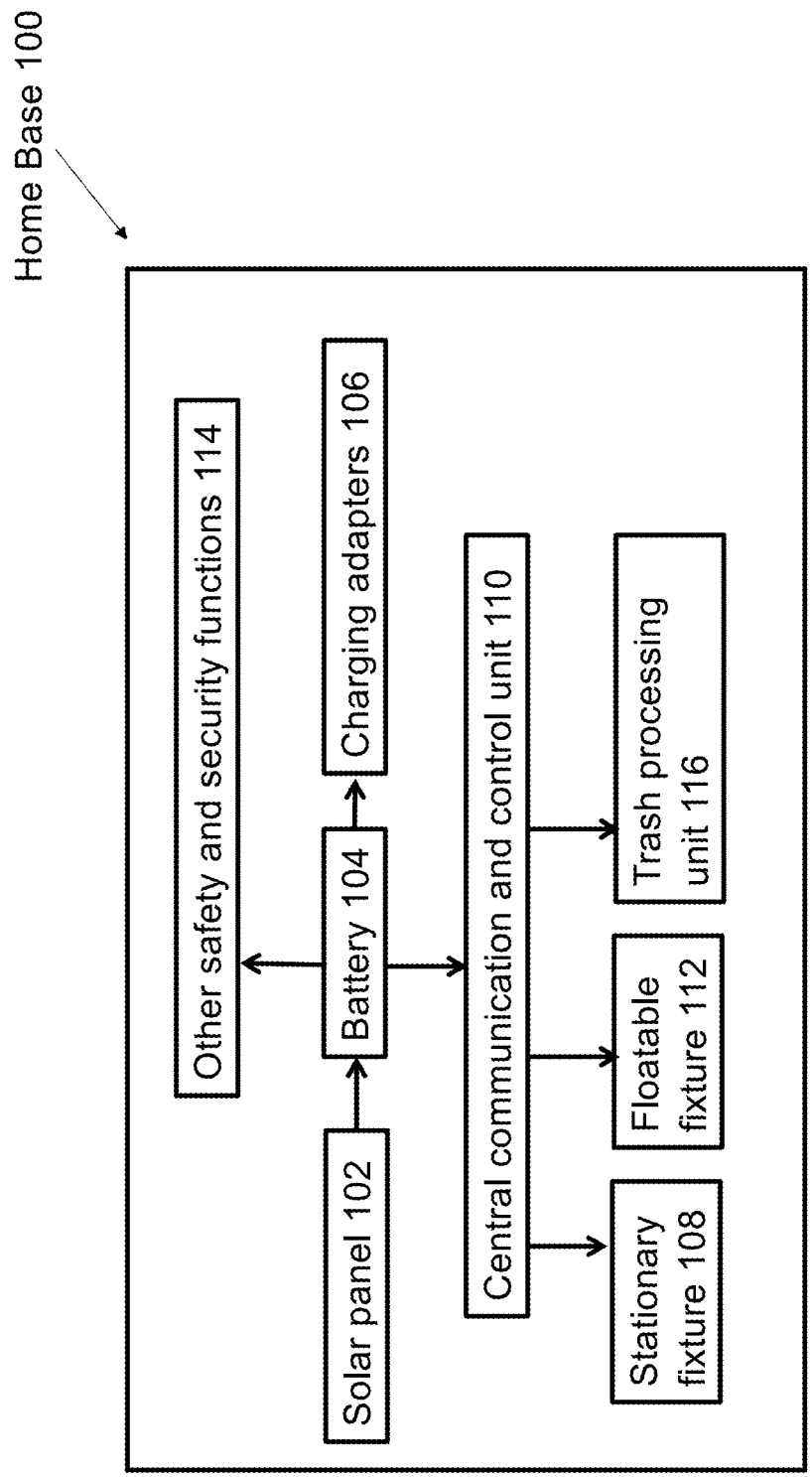
FIG. 1 is a schematic illustration of a home base and the power and instruction flow among the respective components, in accordance with aspects of the present invention.

FIG. 1 is a schematic drawing of an embodiment of a base station. The base station of present invention in configured to provide power charge to the plurality of cleaning robots, configure and communicate with the plurality of cleaning robots, and receive the trash collected by the plurality of cleaning robots.

The base station features a solar panel 102, converting solar power to charge rechargeable batteries 104. A plurality of charging adapters 106, configured to match and receive the charging adapters of the plurality of cleaning robots. The base statin further comprises a fixture to support or anchor the solar panel. The fixture can be in one example fixed on a piece of ground or land. In another example, the fixture is floating on the mobile surface such as water surface.

Further the base station comprises a trash processing unit 116, configured to receive the trash contained at the cleaning robot trash container for subsequent processing, including decomposition, burning or seal of the trash. Because in the filter process, the trashes are already sorted it out, then the trash will not be sorted again. Said subsequent processing includes seal the trash in a container and sink to the deep ocean.

The central communication and control unit 110 of base station, configured to send and receive information from the plurality of cleaning robots. In one example, the central communication and control unit 110 divides the target water area and assign target grid point position for each cleaning robot and send this instruction information to a designated cleaning robot. In another example, the central communication and control unit 110 receives information from each cleaning robot to optimize its travel path for safety and energy efficacy purpose. For example, said information including wave flow rate or GPS location information are sent back to the central communication and control unit 110.

The home base unit may further comprise other safety and security functions. For example, a display indicating current water condition is listed. One feature of the present invention is that the cleaning robot can clean the water surface anytime, it does not require the water surface to be quiet or having no activities.

Pathfinder

The water surface maintenance and cleaning system further includes a self-driven path finder vehicle. The pathfinder vehicle is capable of transport on or above the water surface, having a camera and or at least one position sensor, configured to mapping out the area to be cleaned and determining a target launch grid map, communicate said target grid map to the central communication and control unit of the base.

In one example the pathfinder vehicle is a drone device. The drone device can fly over the targeted area and send out the map information to central communication and control unit.

In another example, the pathfinder vehicle is a messenger robot. The massager robot comprises a robot body, capable of floating on the surface of water, having a top surface and a bottom surface, including a head, tail, and elongated middle portion connecting to the head and tail, including the top surface, a propeller, receiving power from the rechargeable battery, driving the cleaning robot to its target location; a pedal, located at the tail of the robot body, configured to steer robot's orientation; at least one position sensor, configured to detecting the cleaning robot's position. Wherein the position sensor is a GPS location sensor.

Optionally, the massager robot comprises a solar panel.

Preferably, the massager robot further comprises a wave direction sensor, configured to detecting the wave direction or flow direction of the water. Once the flow direction is determined and cleaning robot may be programmed to navigate through the water surface by the energy saving mode.

The massager robot further comprises a camera, placed at least on the head of the cleaning boat, capable of rotating 180 degrees, configured to take images of the water surface in a sweeping manner; and a control and communication unit, configured to take inputs from sensors and cameras and send instruction to the control unit for the pedal and the propeller, and a nonvolatile medium configured to store information from the position sensor, wave direction sensor and camera, and communicate to the central communication and control unit of the base.

Method

In accordance to the second aspect of the present invention, a method to clean a target area of water surface is described. The method comprises a) providing a plurality of cleaning robots as disclosed in the present invention;

b) mapping out the target area water surface and determining an operational protocol including target launch grid position and grid area for each cleaning robot;

c) charging the cleaning robots at a first base station;

d) sending instructions to each cleaning robot, including an intended cleaning protocol, and assigning target launch grid position and grid area for each cleaning robot;

e) launching each cleaning robot to target grid position;

f) removing garbage from the target grid area by each cleaning robot according to a collecting protocol;

g) monitoring battery level and remaining garbage level according to a safety operation protocol;

h) transferring trash collected to a second base station according to a disposal protocol; and i) returning trash collected to the second base station.

Figure 20:
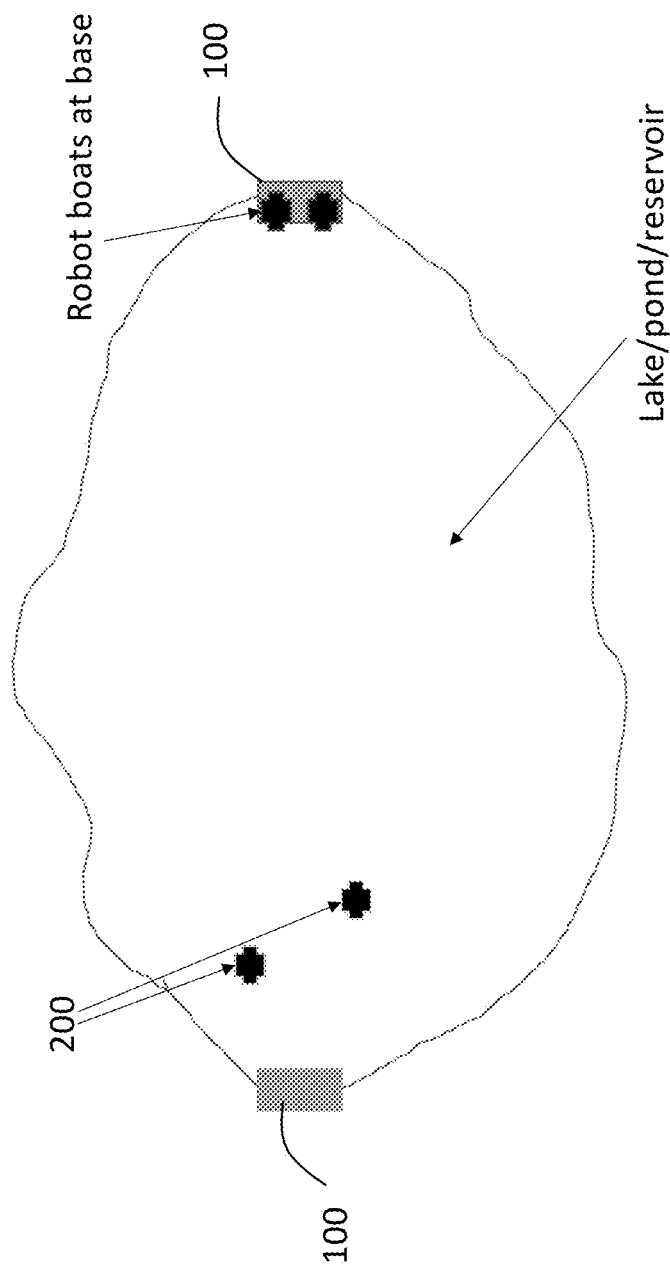
FIG. 20 is a schematic illustration of an operation layout for an enclose water space, for example a reservoir.

Referring to FIG. 20, in one example, the target cleaning water surface is a well-defined water enclosed area, for example, a lake, pond and reservoir. There are two home bases provided. There two sets of cleaning robots. The two sets are taking turns to clean the water surface. Two home bases, the first home base and the second home base, are provided for the two sets of cleaning robots. The first and second home bases are placed at opposing direction with respect to each other, across the diameter or a longest dimension of the enclosed water area. One sets of cleaning robots are working and the other set can be placed at a non-working status including a charging status or idle status.

Figure 22:
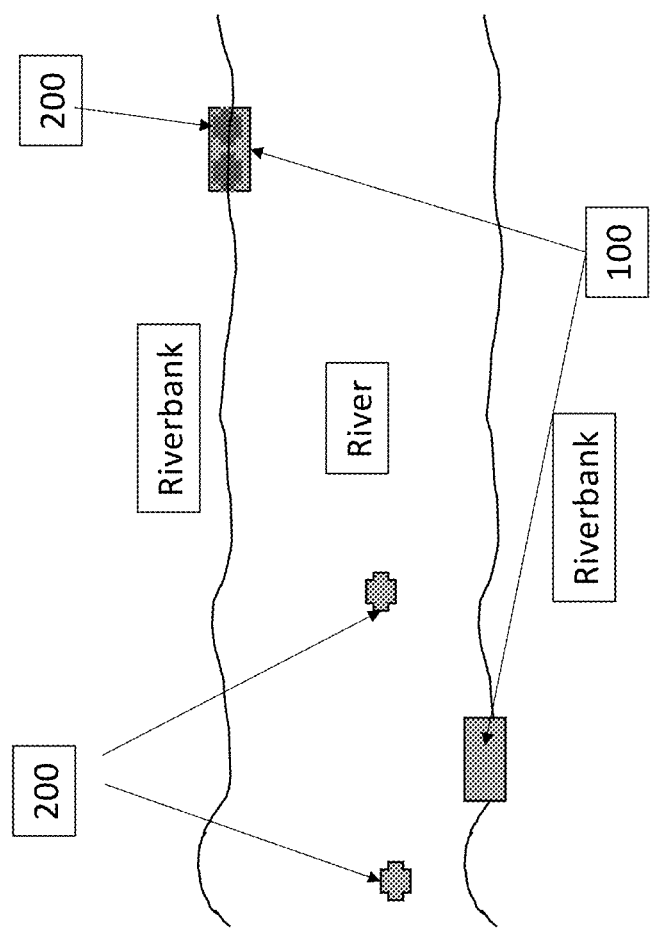
FIG. 22 is a schematic illustration of an operation layout for an open water space, for example a river.

In another example, referring to FIG. 22, the target water surface to be cleaned is a river. The first base and second base are placed along the opposing sides of the river. There are two sets of cleaning robots are provided. The two cleaning robots within the same sets are set off at opposing directions along the river banks.

Figure 21:
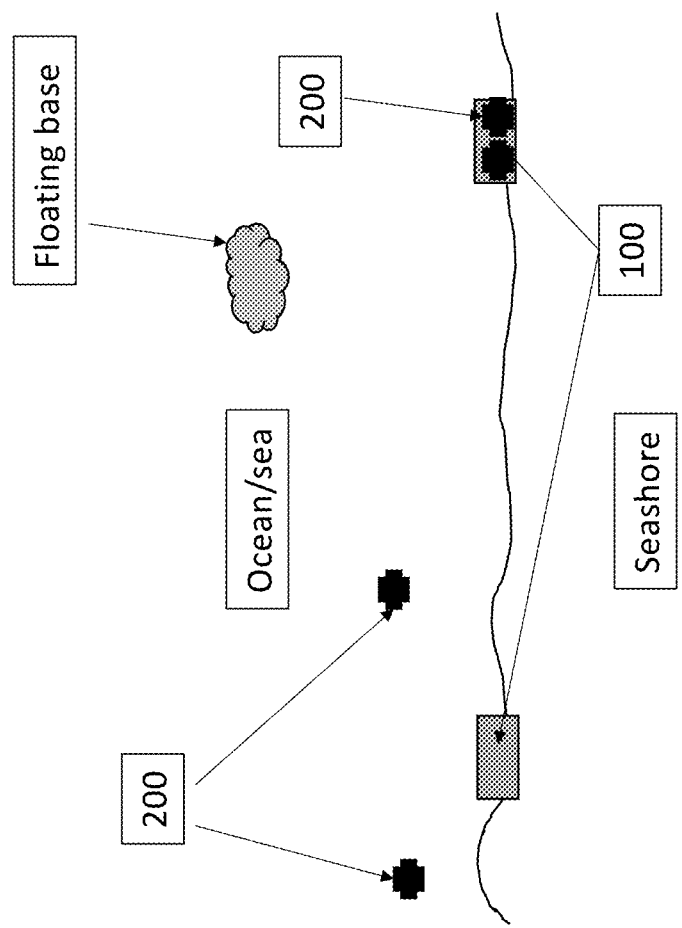
FIG. 21 is a schematic illustration of an operation layout for an open water space, for example a sea.

In still another example, referring to FIG. 21, the target water surface to be cleaned is not an enclosed area, but an ocean. Two home bases are provided along the river banks. A third home base is which is an island floating base.

Figure 23:
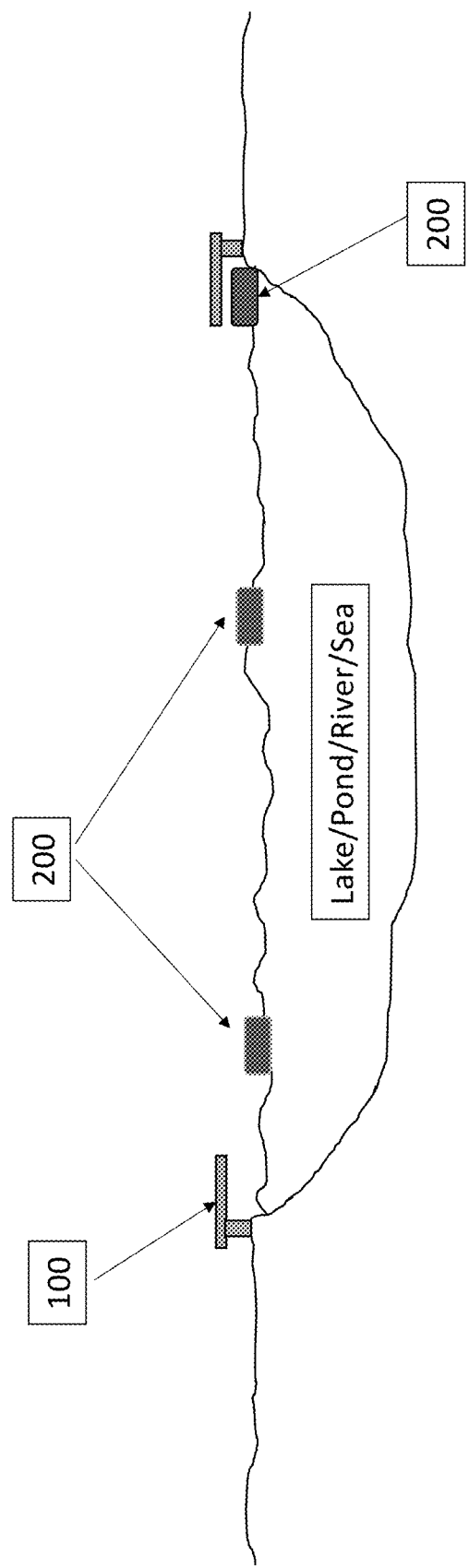
FIG. 23 is schematic illustration of an operation layout for an open water space, for example a sea.

Home bases in FIGS. 21-23 are stationary bases along the river banks and sea shore.

When cleaning robots are docked at the home station, each cleaning robot is connected to the base station through a charging adapter. Referring to FIG. 23, portion of the base station is suspended above the water shore and the charging adapter is positioned on the bottom surface. The cleaning robot is charged while floating on the water.

FIG. 12-19 describe further details of the method of using of the water maintenance and cleaning system of the present invention. The method involves a step of mapping out the target area water surface and determining a target launch grid position and target launch grid area for each cleaning robot. Wherein target grid area means the target total work area, which is divided into a grid map layout according to the job requirement. Some jobs require higher definition of grid point and some only require a rough definition of the grid point. The target launch grid position is a start position for each cleaning robot.

The step of dividing the target work area into a grid map layout and assigning each cleaning robot target launch position is accomplished after the central communication and control unit taking input information from the pathfinder vehicle.

The method steps include first sending off a drone to fly over the target area to be cleaned; collecting imaging and position data of the target area and sending the images data to base station communication and control unit; calculating how many cleaning robots are needed and dividing target cleaning area in a grid layout format to a plurality of sub work areas and assigning the target grid positions and target sub work areas to the plurality of cleaning robots.

In the alternative, the method steps include sending off a messenger robot to run across the target water surface area; imaging the target area to by a camera; measuring the water flow direction of the target water surface area; calculating how many cleaning robots are needed and dividing the target water surface area to a plurality of sub work areas and assigning the target grid positions, target grid areas, intended working mode including target orientation to the plurality of cleaning robots.

The step of calculating how many cleaning robots is needed, further includes determining how many total hours of work is needed for the target clean area; determining battery lifetime for each cleaning robot, then dividing the total hours of work by the battery lifetime. The target grid positions and target sub work areas is sent to the wireless communication and control module of each cleaning robot.

Additionally, in some embodiments, an intended cleaning protocol is sent together to each cleaning robot, which further includes setting a predetermined time interval and threshold value of battery for return; or setting a predetermined weight threshold value of the cleaning net for the cleaning robot to return; or setting a predetermined threshold hour of work value for cleaning robot to return.

Said predetermined time interval includes checking battery level after 0.5-5 hours. Said threshold value of battery for return includes 50% battery capacity. Said predetermined weight threshold value of the cleaning net for the cleaning robot to return is about 1-3 lbs. Said predetermined threshold hour of work value for cleaning robot to return includes 1 hour, 2 hours, 3 hours and 5 hours.

After the cleaning robot is launched into the target grid position, the sensor will measure the wave flow direction, and send this information to the cleaning robot's communication and control unit, which in turn determines its navigation mode for the cleaning robot. Said navigation mode includes travel direction or orientation and speed.

In one variation, upon measuring, wave flow direction is coming towards a narrow passage of the river, then the cleaning robot will be launched initially at the narrow passage and placed at idle mode until trashes arrive at the water passage of the cleaning robot.

In another variation, after the pathfinder examining the target area to be cleaned, it sends out images to the central communication and control center. Based on the images, types of trash may be categorized and appropriate trash cleaning nets will be installed in the cleaning robots. The trash cleaning nets herein includes a two-layer coarse mesh net and fine mesh net assembly, and a three-layer filtration net, the first degree filter net, second degree filter net, and third degree filter net, with increasing mesh in the water flow direction.

Each cleaning robot cleans the area according to its collecting protocol. The collecting protocol includes swiping water surface to collect garbage using two-layer trash collecting net; transferring the content from the trash collecting net to a trash storage container when the trash is separated from the water; and compressing the trash collected using a robotic arm.

Additionally, each cleaning robot also follows a safety operation protocol to monitor the levels of battery, distance with respect to the home base, and distance with respect to another closest neighboring cleaning robot, by obtaining battery power capacity for a predetermined period and compare against a threshold; measuring the water flow direction; and measuring distance with another cleaning robot by radar sensor and send position, distance and battery information back to the home base. sending and receiving location information to one nearest neighboring cleaning robot.

When the cleaning robot is ready to transfer the trash, the communication and control unit will call its disposal protocol stored on its non-volatile memory, to execute a program comprising identifying a closest base and navigation pathway to it; transferring the compressed trash to the closest base station; and charging battery and resetting the operational protocols.

Elements in this invention are
Home base 100
Solar panel 102
Battery 104
Charging station 106
Central communication and control unit 110
Stationary fixture 108
Floatable fixture 112
Trash processing unit 116
Other safety and security functions 114
Cleaning robot 200
Solar panel 202
Battery unit 204
Charging adapter 206
Camera 208
Wireless communication and control unit 210
Sensor unit 212
Propeller unit to drive the robot 214
Trash collecting assembly unit 400
floatable body 220
Messenger robot 300
Solar panel 302
Battery 304
Charging adapter 306
Camera 308
Wireless communication and control unit 310
Sensors 312
Propeller to drive the robot 314
Trash collecting assembly 400
Robotic arm 402
Trash collecting net 404
Trash container 406
Web 408
Filter 409
Divider for cleaning chamber and trash storage chamber 901

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to explain the principles of the invention and its practical applications, they thereby enable others skilled in the art to utilize the invention and various embodiments with various modifications as are suited to the particular use contemplated. It is intended that the following claims and their equivalents define the scope of the invention.

While this invention has been described in terms of several preferred embodiments, there are alterations, modifications, permutations, and substitute equivalents, which fall within the scope of this invention. It should also be noted that there are many alternative ways of implementing the methods and apparatuses of the present invention. It is therefore intended that the following appended claims be interpreted as including all such alterations, permutations, and substitute equivalents as fall within the true spirit and scope of the present invention.

The invention claimed is:

1. An autonomous robotic water surface maintenance and cleaning system for a target area, comprising
   a plurality of water surface maintenance and cleaning robots, each is comprised of
      a robot body, capable of floating on a water surface, having a top surface and a bottom surface, including a head, tail, and elongated middle portion connecting to the head and tail, wherein the top surface is provided with a concave cavity, covered by a solar panel, connected to a rechargeable battery,
      a propeller, receiving power from the rechargeable battery, driving the cleaning robot to a target location;
      a pedal, located at the tail of the robot body, configured to steer robot's orientation;
      a plurality of sensors, including
         a position sensor, configured to detect the cleaning robot's position;
         a wave direction sensor, configured to detect a flow direction of water at the target location;
         radar sensor, configured to detect distance between the cleaning robot and an obstacle;
      a camera, placed at least on the head of the cleaning robot, capable of rotating more than 180 degrees, configured to take images of the water surface in a sweeping manner;
      a trash collecting assembly, removably attach to the bottom surface of the body, comprising at least one trash cleaning net, a robotic arm hingely attached to the bottom of the body configured to compress and push trash collected to a trash container underneath; and
   control and communication unit, taking input from the sensors, and sending out operable instructions to the propeller, the pedal, the camera and sensors and the robotic arm of the trash collecting assembly;
   a base station, configured to provide power charge to the plurality of cleaning robots, comprising
      a solar panel, converting solar power to charge rechargeable batteries,
      a plurality of charging adapters, configured to match and receive charging adapters of the plurality of cleaning robots;
      a fixture to support or anchor the solar panel;
      a trash processing unit, configured to receive the trash contained at the cleaning robot trash container for subsequent processing;

a central communication and control unit, configured to send and receive information from the cleaning robots; and a self-driven pathfinder vehicle, capable of transport on or above the water surface, having a camera and or at least one position sensor, configured to map out the area to be cleaned and determining a target launch grid map, communicate said target grid map to the central communication and control unit of the base.

2. The system of claim 1, wherein the pathfinder vehicle is a drone device.

3. The system of claim 1, wherein the pathfinder vehicle is a messenger robot, comprising at least one position sensor, configured to detect the cleaning robot's position;

a wave direction sensor, configured to detect flow direction of water of the target area;

a camera, placed at least on the head of the cleaning boat, capable of rotating more than 30 degrees, configured to take images of the water surface in a sweeping manner;

a control and communication unit, configured to take inputs from sensors and cameras and send instruction to the control unit for the pedal and the propeller, and a nonvolatile medium configured to store information from the position sensor, wave direction sensor and camera, and communicate to the central communication and control unit of the base.

4. The system of claim 1, wherein the fixture is a stationary base anchored on a shore or river bank.

5. The system of claim 1, wherein the fixture is a floating base, at least part of the fixture is in contact with water in the target area.

6. The system of claim 1, wherein the cleaning net is made of a multiplayer assembly, including a coarse net and fine net, arranged in that order facing an incoming water pathway.

7. The system of claim 1, wherein a movable divider is provided between the bottom surface of the body and a top surface of the trash container.

8. The system of claim 1, wherein the propeller is positioned at the tail of the body of the cleaning robot, either positioned above the water or positioned under the water.

* * * * *